(12) United States Patent
Lee

(10) Patent No.: US 6,302,373 B1
(45) Date of Patent: Oct. 16, 2001

(54) BALL VALVE

(76) Inventor: Jen-Chieh Lee, 47-2, Ju-Yi Road., Hsi-Chi Li, Ta Chia Township, Taichung Hsien (TW)

( * ) Notice: Subject to any disclaimer, the term of this patent is extended or adjusted under 35 U.S.C. 154(b) by 0 days.

(21) Appl. No.: 09/713,397

(22) Filed: Nov. 16, 2000

(51) Int. Cl.[7] .................................................. F16K 5/06
(52) U.S. Cl. .............................. 251/315.11; 251/315.14; 137/557
(58) Field of Search ..................... 251/315.11, 315.14, 251/315.12, 315.1, 315.01; 137/557

(56) References Cited

U.S. PATENT DOCUMENTS

| | | | | |
|---|---|---|---|---|
| 1,577,900 | * | 3/1926 | Evans | 251/315.1 X |
| 3,333,813 | * | 8/1967 | Rabe | 251/315.11 X |
| 3,985,334 | * | 10/1976 | Domyan | 251/315.11 X |
| 4,319,734 | * | 3/1982 | Acar | 251/315.11 X |
| 4,423,749 | * | 1/1984 | Schmitt | 251/315.21 X |
| 4,708,158 | * | 11/1987 | Akamatsu | 251/315.1 X |
| 4,718,444 | * | 1/1988 | Boelte | 251/315.12 X |
| 4,976,403 | * | 12/1990 | Bramblet | 251/315.11 X |
| 5,036,883 | * | 8/1991 | McHugh | 251/315.04 X |
| 5,152,503 | * | 10/1992 | Conway | 251/315.14 |
| 5,313,976 | * | 5/1994 | Beasley | 251/315.11 X |
| 5,551,479 | * | 9/1996 | Graves | 251/315.12 X |
| 5,562,116 | * | 10/1996 | Henwood | 251/315.14 X |
| 5,873,389 | * | 2/1999 | Cheng | 251/315.12 X |
| 5,927,685 | * | 7/1999 | Gosling | 251/315.12 X |
| 5,941,266 | * | 8/1999 | Henwood | 251/315.14 X |

* cited by examiner

Primary Examiner—Kevin Shaver
Assistant Examiner—John Bastianelli
(74) Attorney, Agent, or Firm—Harrison & Egbert

(57) ABSTRACT

A ball valve has a main body provided with a rib plate, a receiving cell chamber, a first threaded tubular portion in communication with the receiving chamber, an extension channel, and a second threaded tubular portion in communication with the extension chamber. The main body is further provided with a threaded mouth via which a washer, a rotary shaft member, and a spherical body are removably disposed in the receiving chamber. The threaded mouth is sealed off with a cover.

5 Claims, 13 Drawing Sheets

BALL VALVE

BACKGROUND OF THE INVENTION

1. Field of the Invention

The present invention relates generally to a valve, and more particularly to a ball valve.

2. Description of Related Art

As shown in FIG. 1, a prior art ball valve 40 is provided in the interior of a tubular body 41 thereof with a threaded portion 42, a rotary shaft member 1, a spherical body 2, a washer 3, and an annular locking member 43. The prior art ball valve 40 is limited in design because it can only be joined with the pipeline in a limited direction, and because it cannot be easily maintained or repaired.

As shown in FIG. 2, another prior art ball valve 50 has a tubular body 51 which is provided in the interior with a threaded port 52, a rotary shaft member 1, a spherical body 2, a washer 3, and a threaded tubular member 53. This prior art ball valve 50 cannot be easily maintained or repaired.

As shown in FIG. 3, a prior art French-type ball valve 60 has a main tubular body 61 which is provided in the interior thereof with a rotary shaft member 1, a spherical body 2, a washer 3, and a secondary tubular body 62. The prior art ball valve 60 cannot be easily maintained or replaced.

As shown in FIG. 4, a prior art ball valve 70 has a main valve body 71, which is joined with the pipeline by means of two secondary valve tubes 72. The prior art 70 is relatively complicated in construction and is therefore not cost-effective.

BRIEF SUMMARY OF THE INVENTION

The primary objective of the present invention is to provide a ball valve which is free of the deficiencies of the prior art ball valves described above.

The features, functions, and advantages of the present invention will be readily understood upon a thoughtful deliberation of the following detailed description of the present invention with reference to the accompanying drawings.

DETAILED DESCRIPTION OF THE INVENTION

Figure 1:
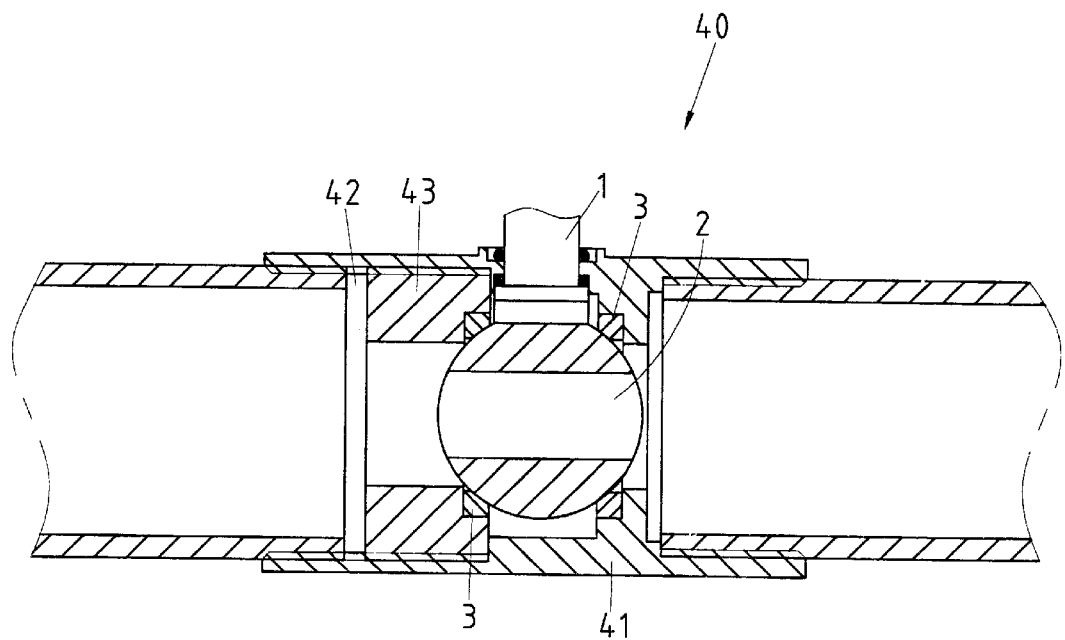
FIG. 1 shows a longitudinal sectional view of a first prior art ball valve.
Figure 2:
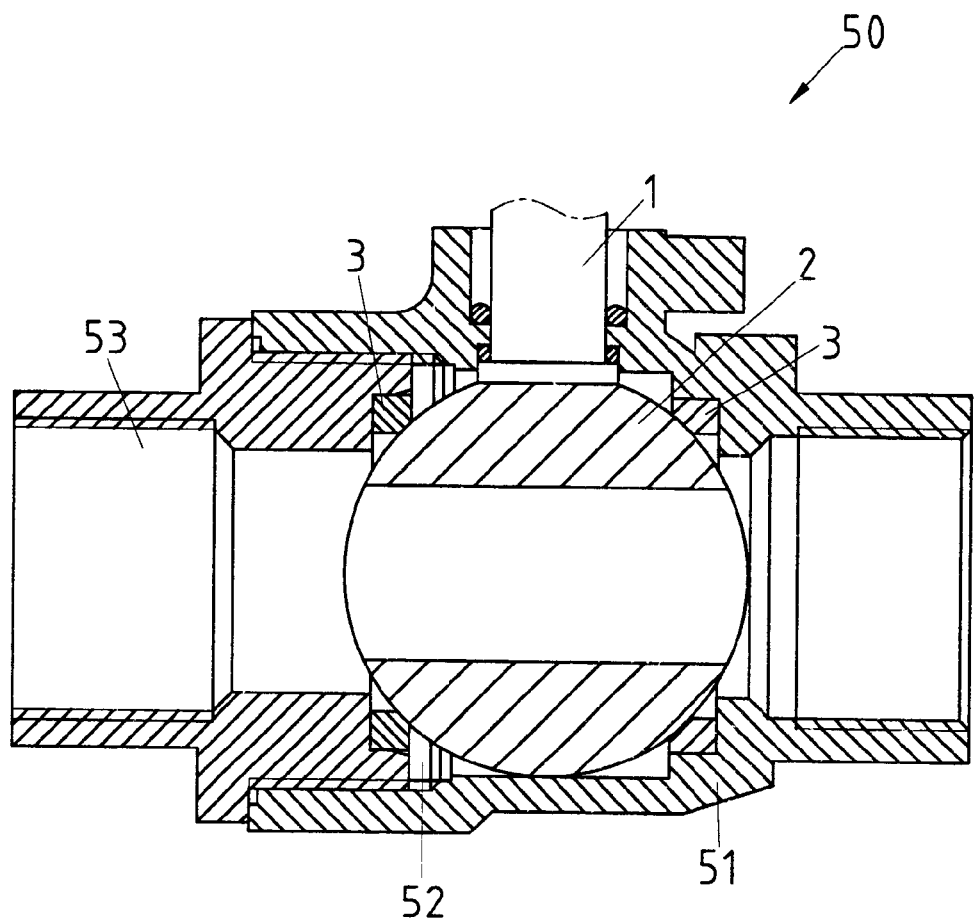
FIG. 2 shows a sectional view of a second prior art ball valve.
Figure 3:
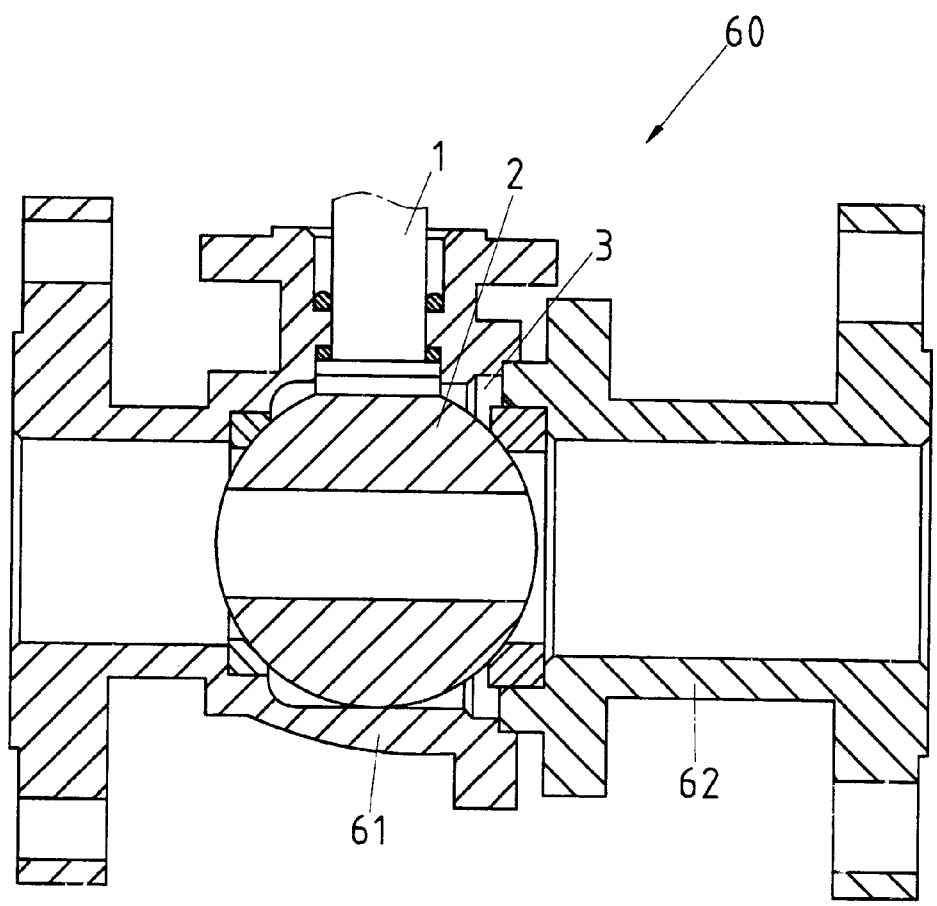
FIG. 3 shows a sectional view of a third prior art ball valve.
Figure 4:
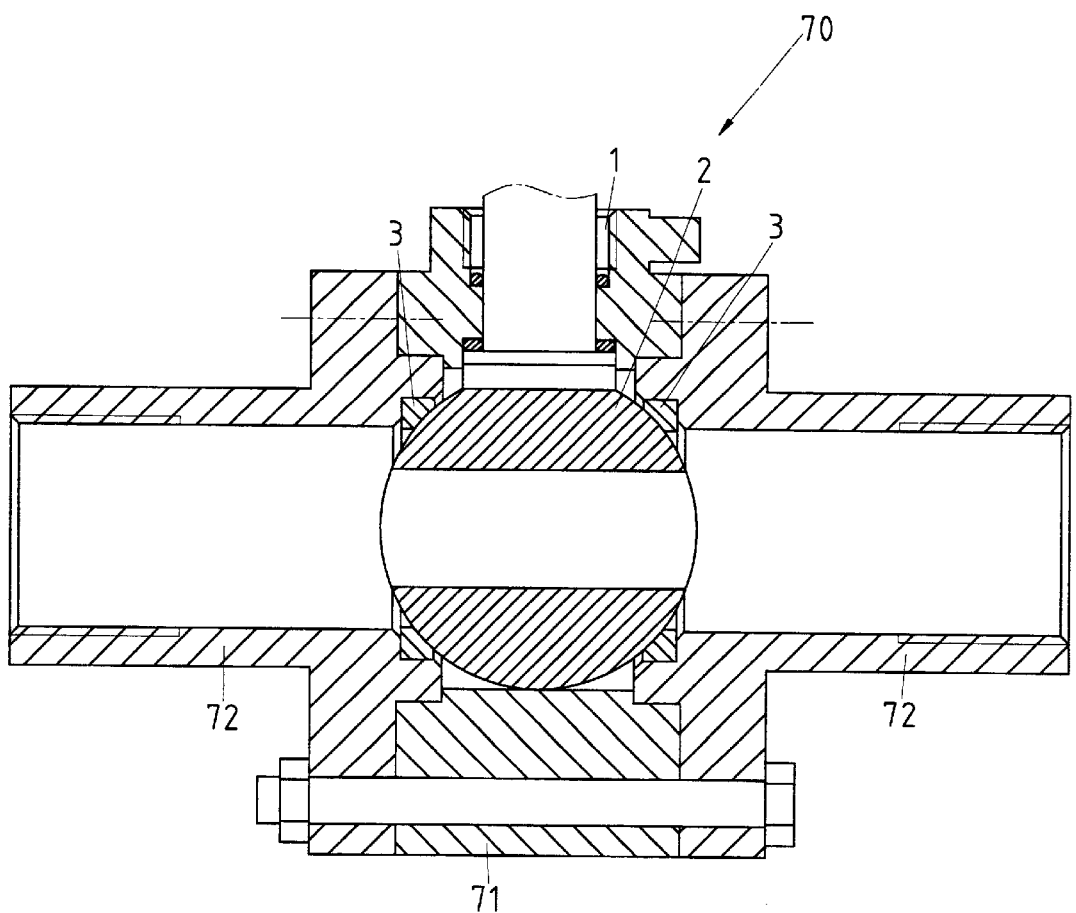
FIG. 4 shows a sectional view of a fourth prior art ball valve.
Figure 5:
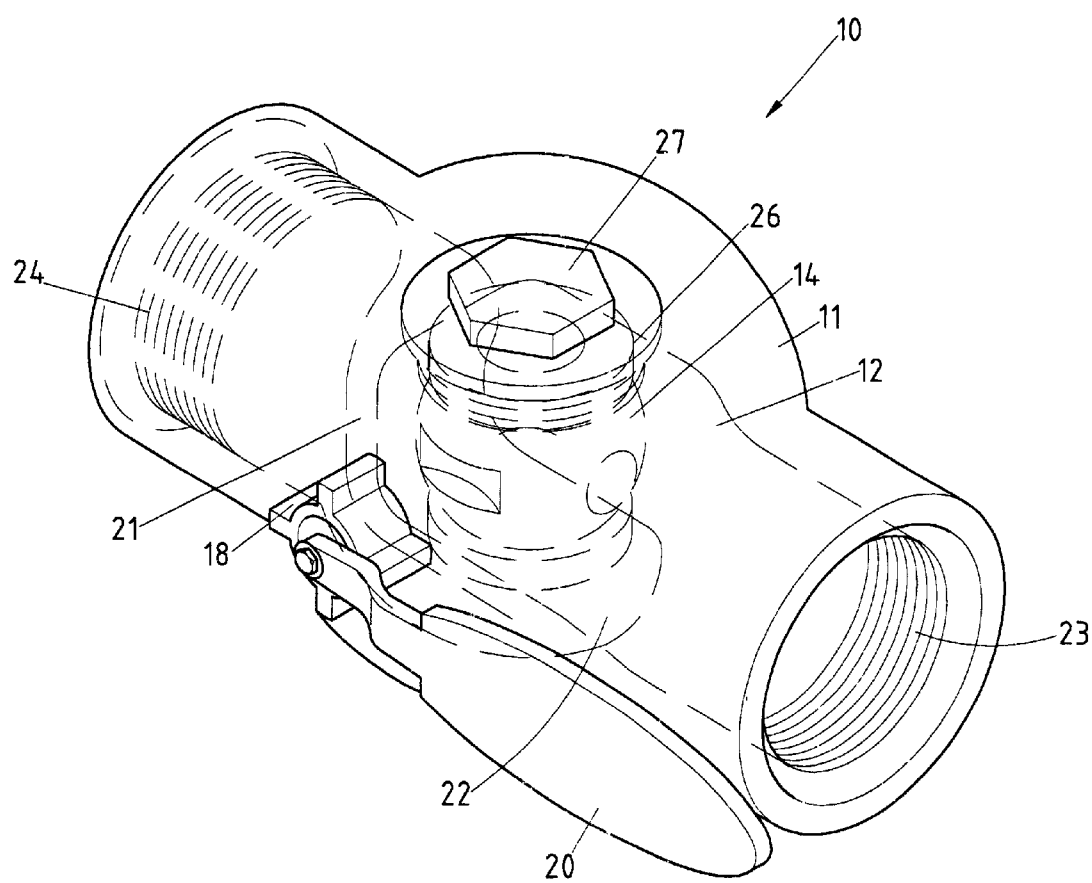
FIG. 5 shows a perspective view of the present invention.
Figure 6:
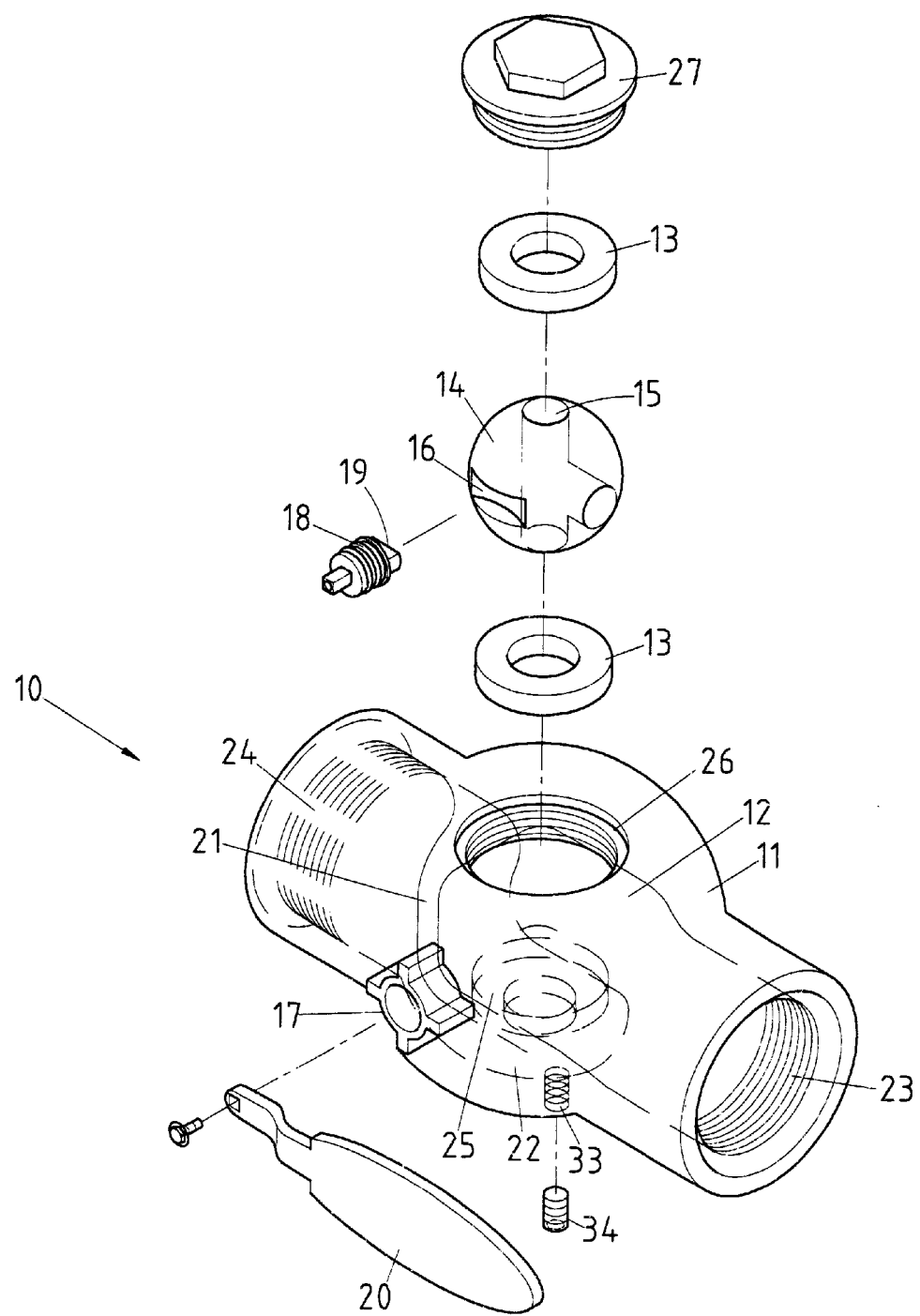
FIG. 6 shows an exploded view of the present invention.
Figure 7:
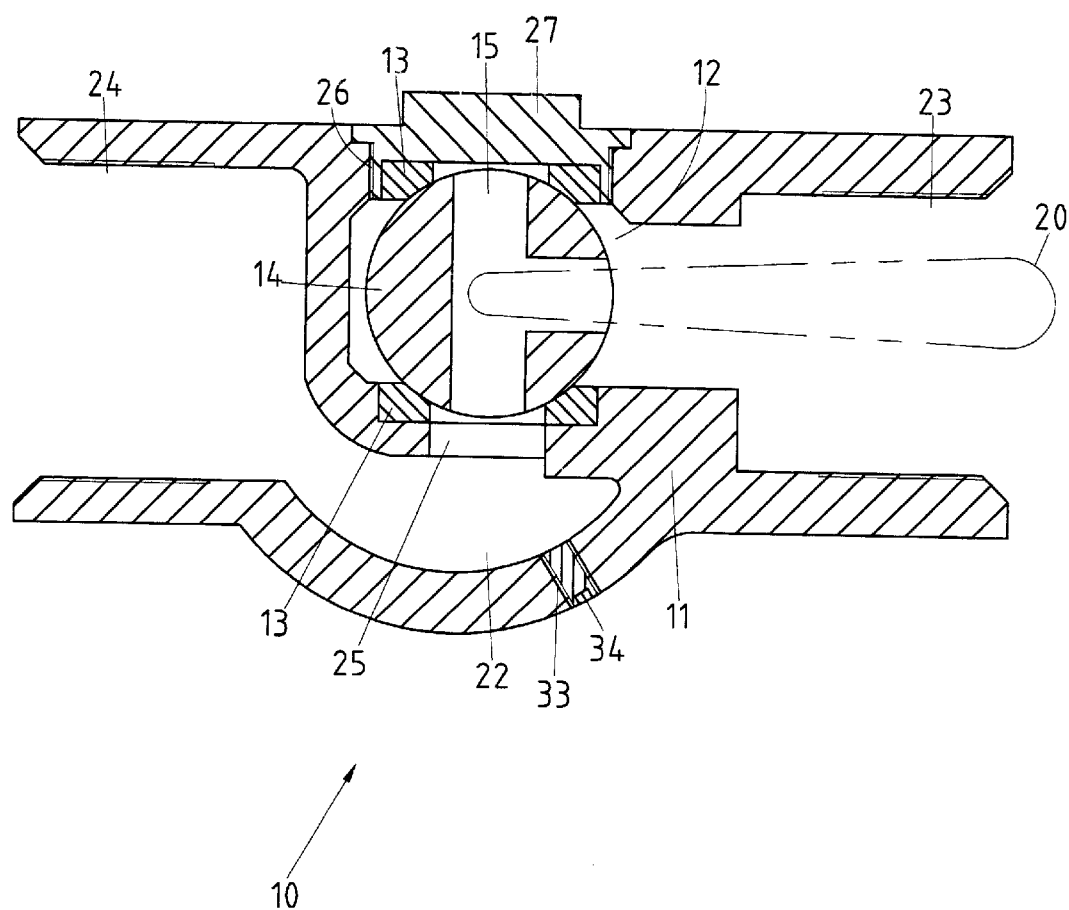
FIG. 7 shows a sectional view of the present invention.

As shown in FIGS. 5, 6, and 7, a ball valve 10 of the present invention has a main body 11 which is provided in a receiving chamber 12 thereof with a spherical body 14 held between two washers 13. The spherical body 14 is provided with a cross through hole 15 and a retaining slot 16 in which a protruded edge 19 of the bottom of a rotary shaft member 18 is retained. The rotary shaft member 18 is put through an axial hole 17 and is provided at the outer end thereof with a handle 20 fastened thereto for actuating the spherical body 14. The feature of the present invention is that the main body 11 has a rib plate 21, a first threaded tubular portion 23, and a second threaded tubular portion 24 which is connected to an extension channel 22 of the rib plate 21. The rib plate 21 is provided with a valve opening 25 in communication with the extension channel 22 and the receiving chamber 12. The receiving chamber 12 of the main body 11 is provided with a threaded mouth 26 via which the washer 13, the rotary shaft member 18, and the spherical body 14 are disposed in the receiving chamber 12. The threaded mouth 26 is sealed off with a cover 27. The ball valve of the present invention can be easily maintained or replaced by removing the washer 13, the rotary shaft member 18, and the spherical body 14 from the receiving chamber 12 via the threaded mouth 26.

The main body 11 of the present invention is provided with a threaded bolt hole 33 and a fastening bolt 34 which is engaged with the threaded bolt hole 33. The fluid residue in the ball valve 10 of the present invention can be easily drained via the threaded bolt hole 33 to facilitate the maintenance work on the ball valve 10.

Figure 8:
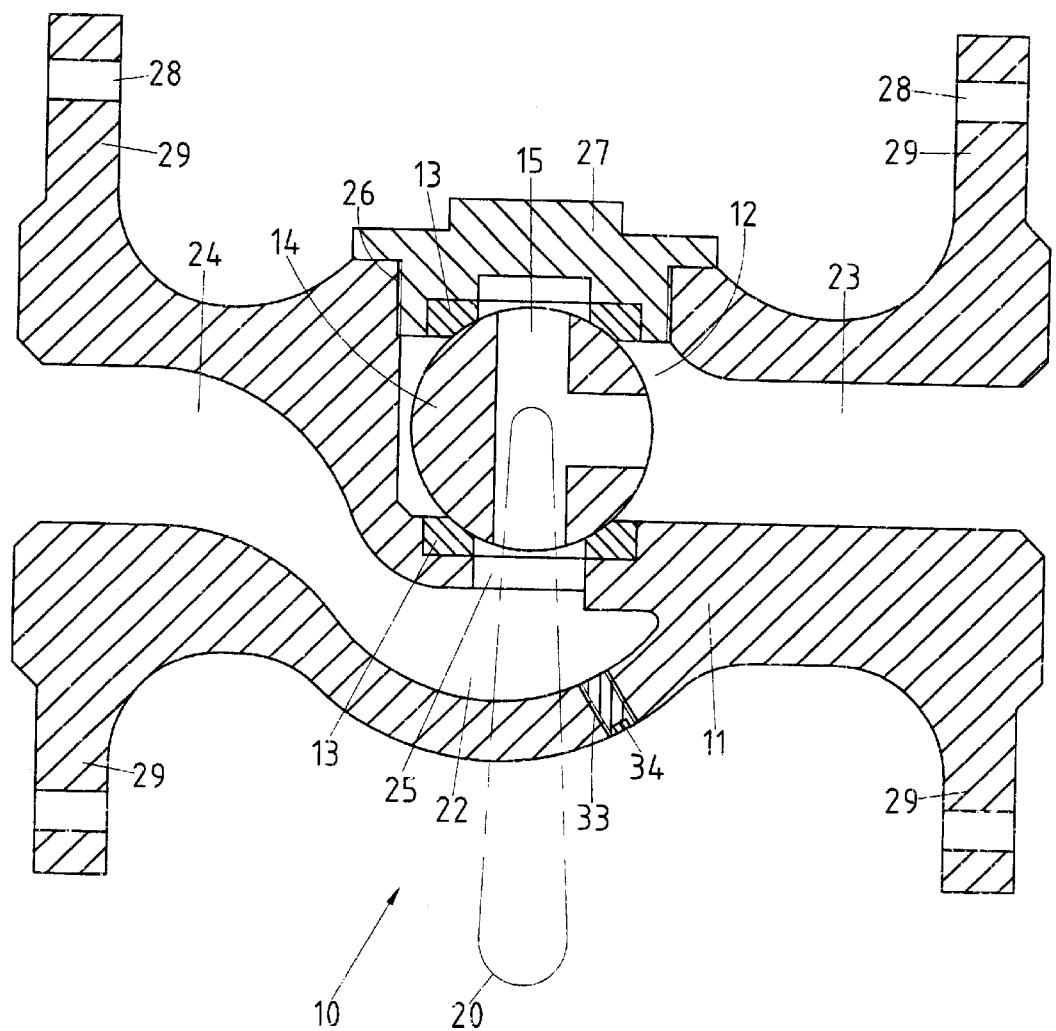
FIG. 8 shows a schematic view of the present invention as defined in claim 3.

As shown in FIG. 8, the main body 11 of the ball valve 10 of the present invention is provided with two plate portions 29 in place of the first threaded tubular portion 23 and the second threaded tubular portion 24. The plate portion 29 are provided with a bolt hole 28.

Figure 9:
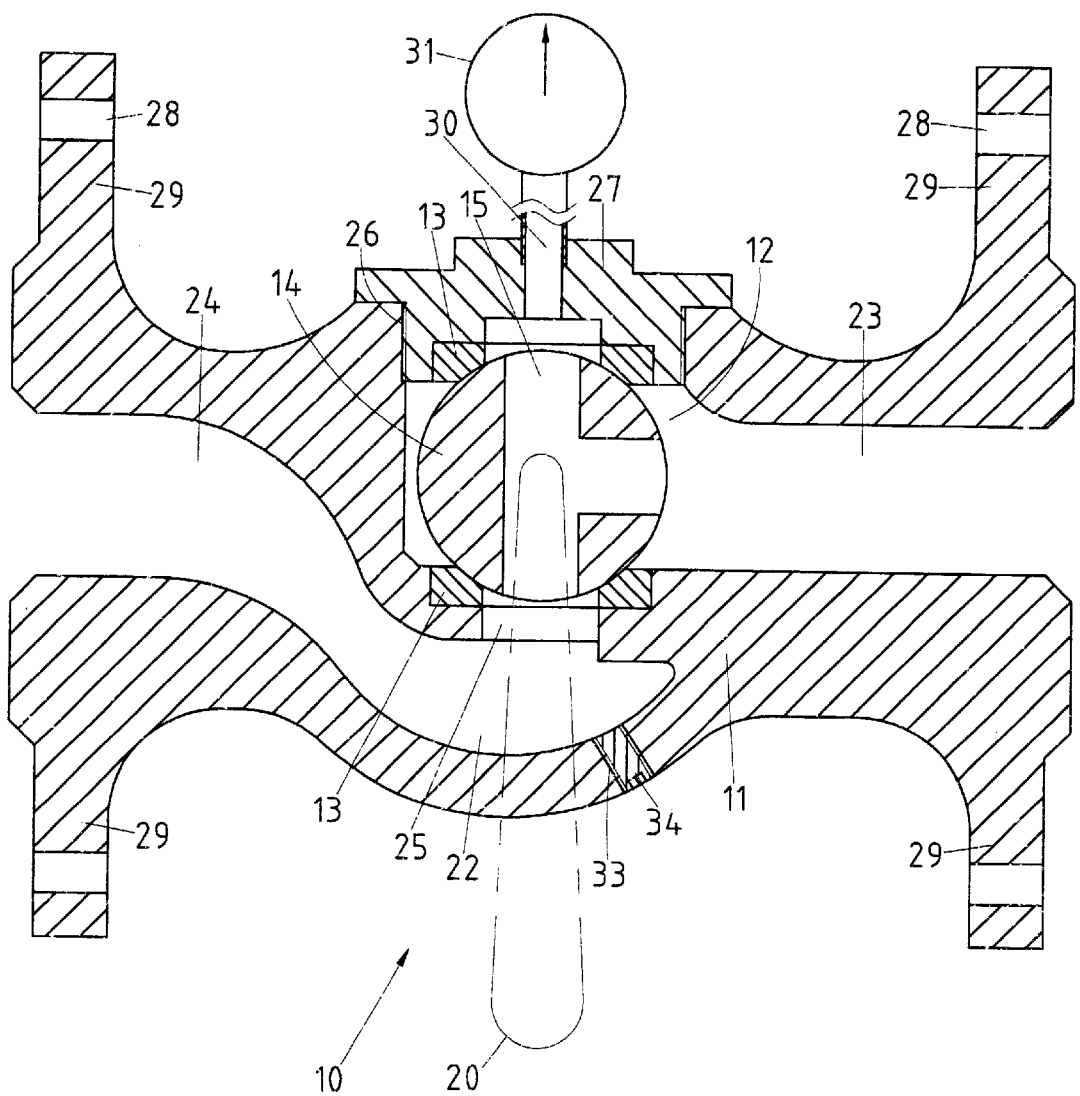
FIG. 9 shows a schematic view of the present invention as defined in claim 4.

As shown in FIG. 9, the cover 27 of the threaded mouth 26 of the present invention is provided with a guide hole 30 in communication with the receiving chamber 12. The guide hole 30 has an outer end in communication with a pressure meter 32 for measuring the pressure of the inside of the ball valve 10 of the present invention.

Figure 10:
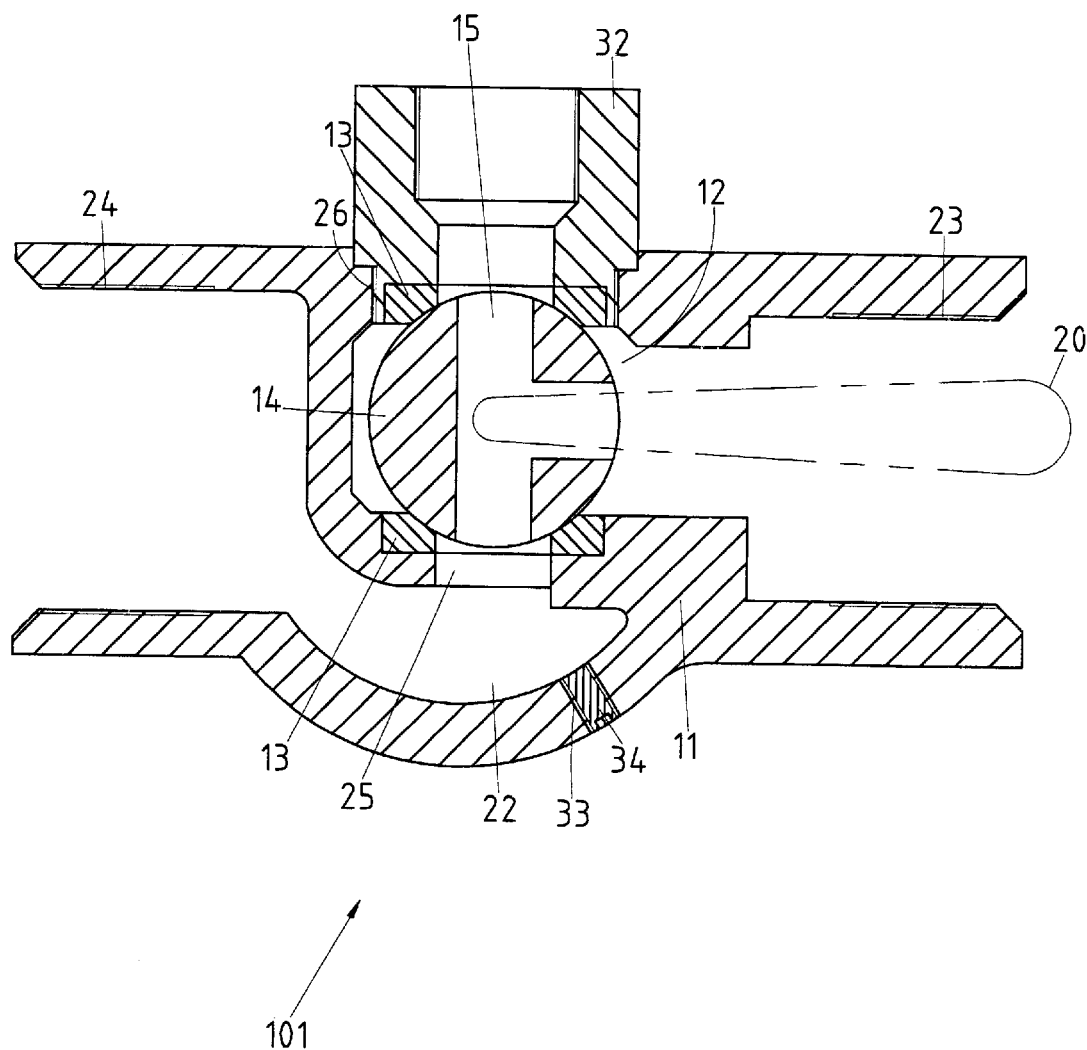
FIG. 10 shows a schematic view of the present invention as defined in claim 5.

As shown in FIG. 10, the threaded mouth 26 of the ball valve 10 of the present invention is provided with a branched pipe 32 in place of the cover 27. The branched pipe 32 is intended to accommodate a three-way ball valve 101.

Figure 11:
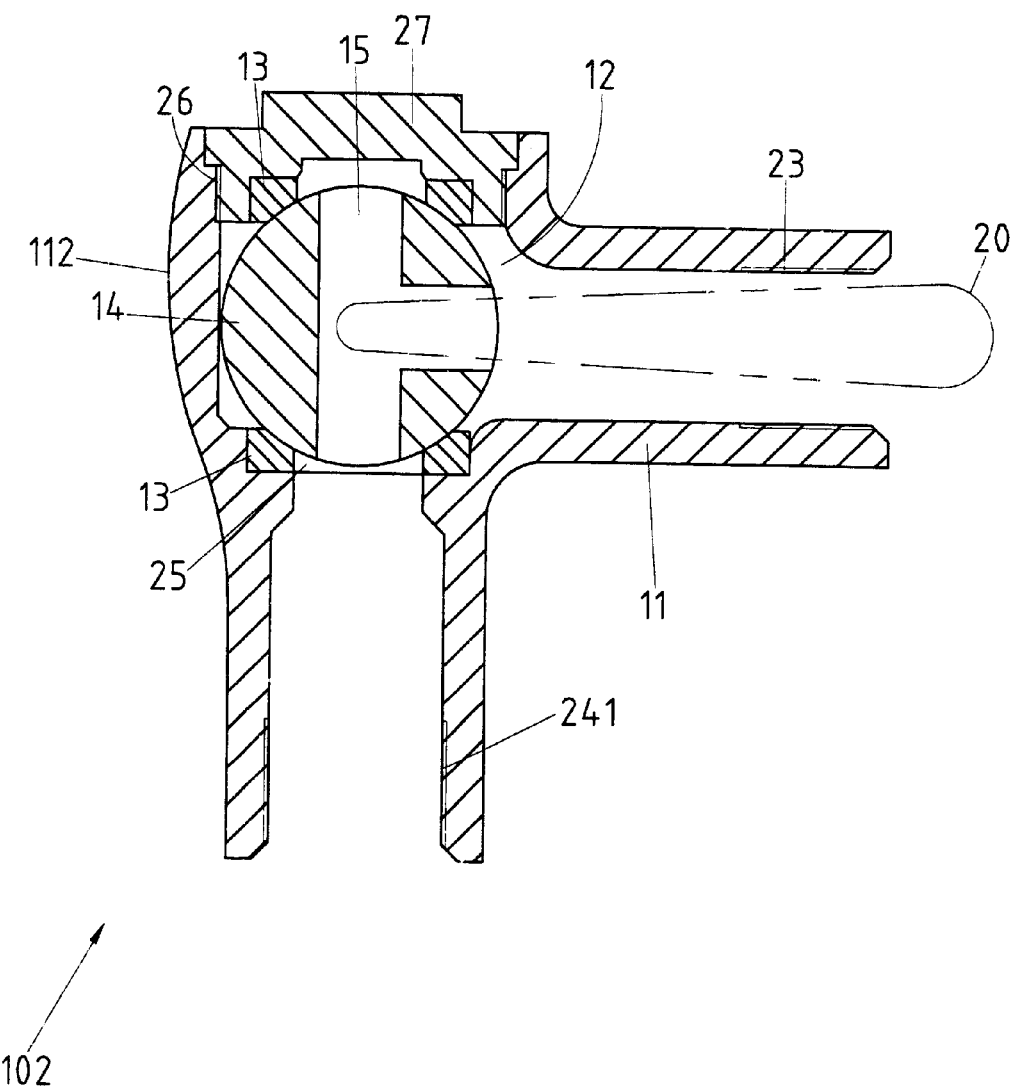
FIG. 11 shows a schematic view of the present invention as defined in claim 6.

As shown in FIG. 11, the main body 11 of the ball valve 10 of the present invention is provided with a third threaded tubular 241 in place of the second tubular portion 24 such that a curved valve body 12 is formed. The curved valve body 112 is provided with a threaded mouth 26 via which the washer 13, the rotary shaft member 18, and the spherical body 14 are disposed in the receiving chamber 12. The threaded mouth 26 is sealed off by the cover 27. As a result, a curved ball valve 102 is formed.

Figure 12:
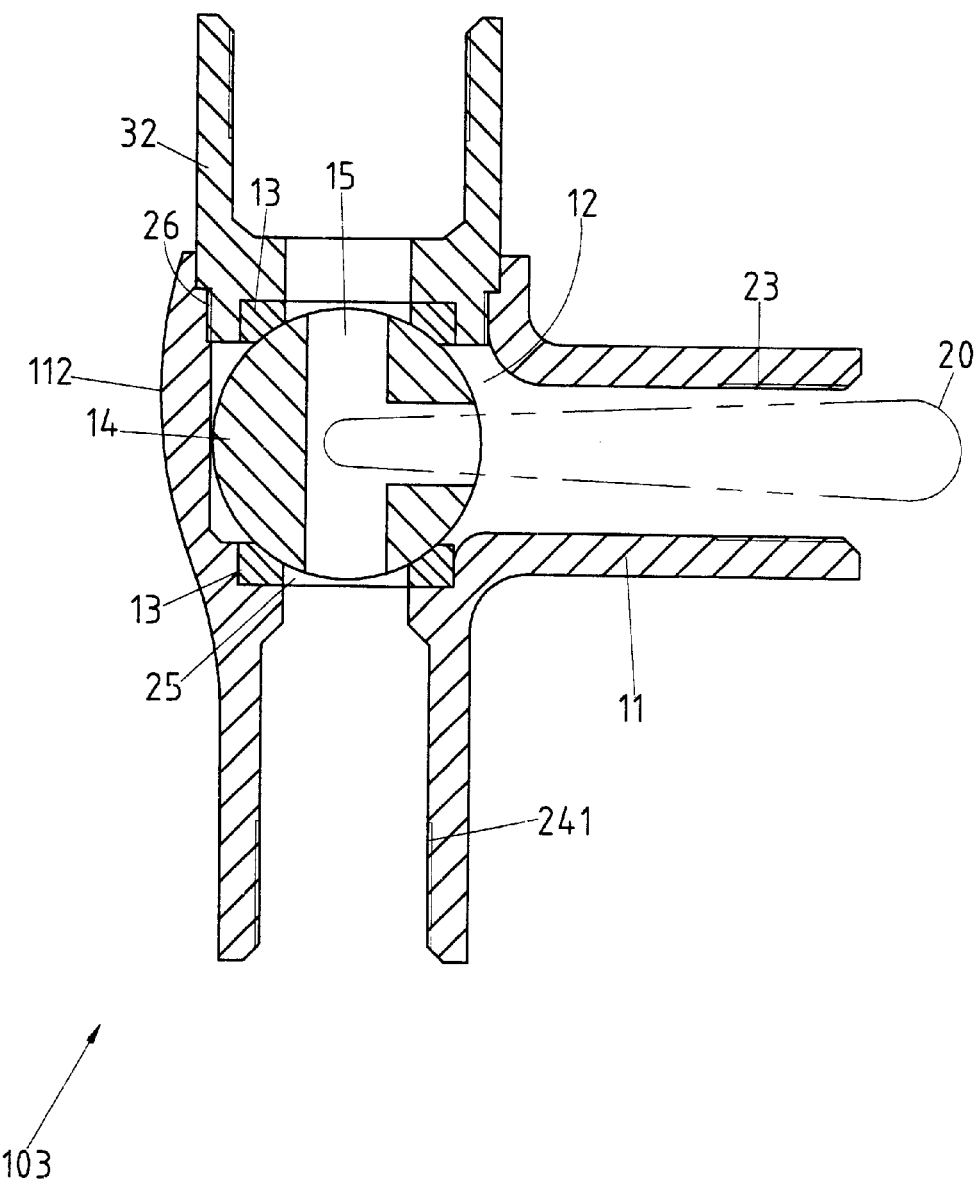
FIG. 12 shows a schematic view of the present invention as defined in claim 7.

As shown in FIG. 12, the cover 27 of the curved ball valve 102 is replaced by the branched pipe 32 so as to accommodate the three-way ball valve 103.

Figure 13:
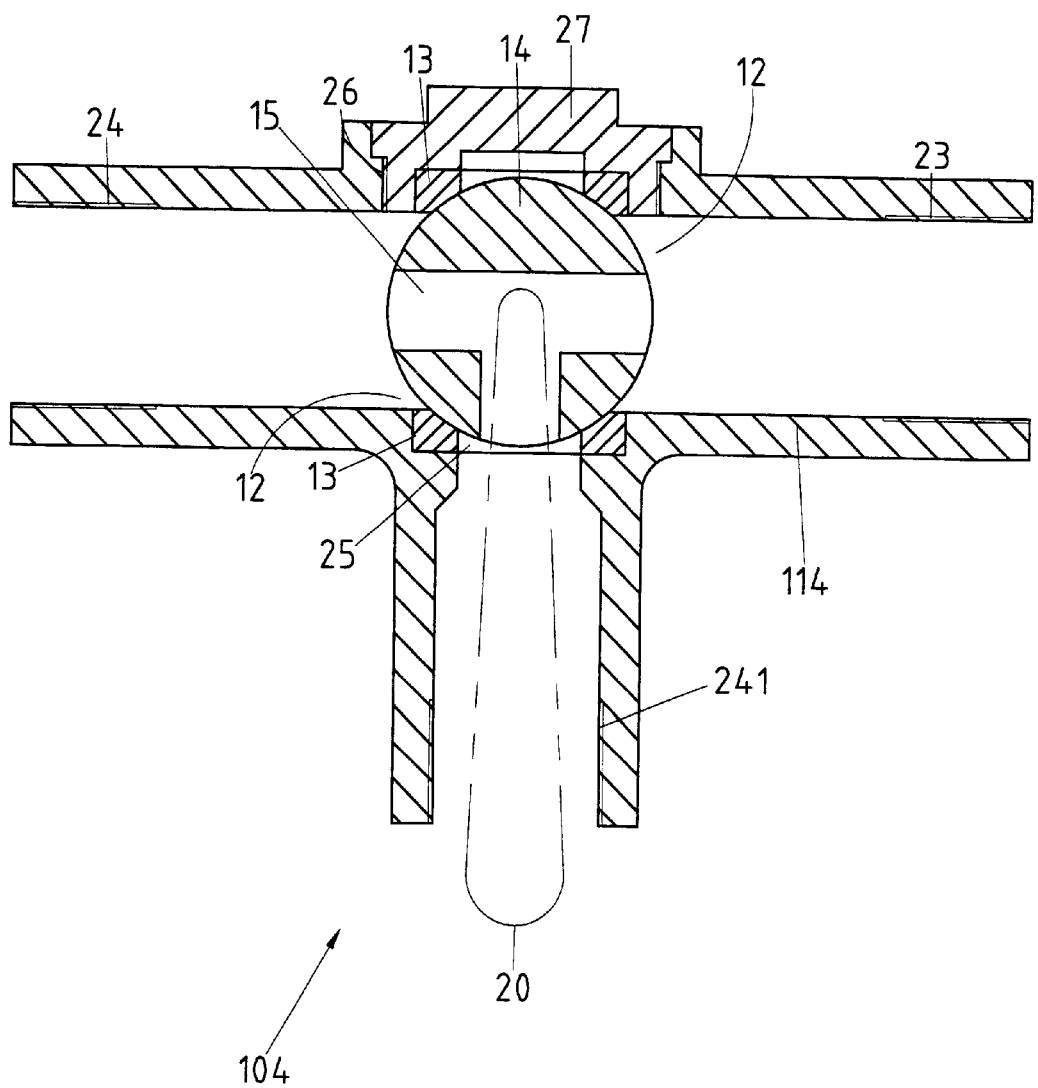
FIG. 13 shows a schematic view of the present invention as defined in claim 8.

As shown in FIG. 13, the curved valve main body 112 is replaced by a three-way valve tube 114 which is provided with a threaded mouth 26 via which the washer 13, the rotary shaft member 18, and the spherical body 14 are disposed in the receiving chamber 12.

The embodiments of the present invention described above are to be regarded in all respects as being merely illustrative and not restrictive. Accordingly, the present invention may be embodied in other specific forms without deviating from the spirit thereof. The present invention is therefore to be limited only by the scope of the following appended claims.

I claim:

1. A ball valve comprising:

a main body having a receiving chamber interior thereof;

a spherical body positioned within said receiving chamber, said spherical body having a cross through hole, said spherical body having a retaining slot formed thereon;

a first washer juxtaposed against said spherical body in generally liquid-tight relationship therewith;

a second washer interposed between said spherical body and a wall of said main body;

a rotary shaft member extending through an axial hole formed in said main body, said rotary shaft member having a protruded edge retained in said retaining slot of said spherical body;

a handle means affixed to an end of said rotary shaft member extending outwardly of said main body, said handle means for actuating said spherical body, said main body comprising:

a rib plate defining a wall of said receiving chamber adjacent said spherical body;

a first threaded tubular portion extending outwardly from said receiving chamber;

an extension channel in communication with said receiving chamber through a hole in said wall of said receiving chamber through an interior of said second washer, said extension channel extending around said rib plate;

a second threaded tubular portion in communication with said extension channel, said second threaded tubular portion positioned on an opposite side of said receiving chamber from said first threaded tubular member;

a threaded mouth communicating with said receiving chamber, said first washer being removably retained in said threaded mouth, said spherical body and said washer and said rotary shaft member being removable through said threaded mouth; and a cover removably fastened to said threaded mouth such that said first washer is interposed between said cover and said spherical body.

2. The ball valve of claim 1, said main body having a threaded bolt hole communicating with said extension channel, the ball valve further comprising:

a fastening bolt removably threadedly engaged with said threaded bolt hole.

3. The ball valve of claim 1, said main body having a first plate portion at one end thereof and a second plate portion at another end thereof.

4. The ball valve of claim 1, said cover having a guide hole formed therein, said guide hole in communication with said receiving chamber, the ball valve further comprising:

a pressure meter connected to said guide hole and extending outwardly above said cover.

5. The ball valve of claim 1, said cover having a pipe formed therein, said pipe in communication with said receiving chamber.

* * * * *